United States Patent [19]
Proskow

[11] 3,859,330
[45] Jan. 7, 1975

[54] ULTRAVIOLET ABSORBING COATING COMPOSITIONS

[75] Inventor: Stephen Proskow, Wilmington, Del.

[73] Assignee: E. I. du Pont de Nemours and Company, Wilmington, Del.

[22] Filed: Mar. 15, 1972

[21] Appl. No.: 234,995

[52] U.S. Cl. ......... 260/47 UA, 117/138.8, 117/148, 117/161, 260/33.4, 260/827
[51] Int. Cl. ............................................. C08f 15/00
[58] Field of Search ....... 260/47 UA, 47 UR, 80.75, 260/87.1, 80.72

[56] References Cited
UNITED STATES PATENTS

| | | | |
|---|---|---|---|
| 2,938,883 | 5/1960 | Raich | 260/45.85 |
| 3,141,903 | 7/1964 | Fertig | 260/473 |
| 3,162,676 | 12/1974 | Goldberg | 260/486 |
| 3,320,116 | 5/1967 | Tocker | 161/252 |
| 3,399,173 | 8/1968 | Heller | 260/47 UA |
| 3,429,846 | 2/1969 | Bechtold | 260/29.6 |
| 3,493,539 | 2/1970 | Skoultchi | 260/47 UA |

*Primary Examiner*—Christopher A. Henderson

[57] ABSTRACT

Polymers having recurring units of $(CF_2CFX)$ alternating with units of $(CH_2CHO(CH_2)_nOH)$ and $(CH_2CH[O(CH_2)_n]_mOR)$ where X is F of Cl, $n$ and $m$ are small integers, and R is an aromatic UV light absorber moiety bonded by aromatic carbon, are soluble in polar solvents, and are useful as protective coatings alone or with polysilicic acid for polymers, wood or other materials.

4 Claims, No Drawings

ULTRAVIOLET ABSORBING COATING COMPOSITIONS

FIELD OF THE INVENTION

This invention relates to coating compositions and more particularly to copolymers of tetrafluoroethylene with vinyl ethers of which some have ultraviolet absorbing groups and others have primary alcoholic hydroxyls.

BACKGROUND OF THE INVENTION

Many polymers are deficient in weatherability due to the adverse effects of ultraviolet light on their exposed surfaces. Furthermore, many self-supporting tough transparent polymer structures are relatively easily scratched or abraded and lose their optical clarity when employed for glazing, particularly as glass substitutes.

A coating composition that improves scratch resistance has been described in U.S. Pat. No. 3,429,845. Complexes of polysilicic acid with copolymers of tetrafluoroethylene with hydroxyvinyl ethers are provided. The patent indicates that ultraviolet absorbers can be present also in the coating composition. Effective stabilization to ultraviolet light by addition of conventional screeners has not been obtained in this manner, evidently due to the loss of conventional absorbing agent by migration into the substrate or by volatilization, particularly during the curing process required. Synthesis of polyfunctional absorbers of higher molecular weight decreased the volatility but the screening agent migrated into the transparent polymer or had limited durability due to moisture sensitivity of hydrophilic groups. Polymeric screening agents hereto available are generally incompatible or insoluble in polar coating solutions. When monomers, such as vinyl salicylate, vinyloxybutyl salicylate, and methyl-4-vinyloxy-2-hydroxybenzoate were incorporated during polymerization with tetrafluoroethylene and 4-hydroxybutyl vinyl ether, terpolymers having 1.0–2.5 percent of the aromatic monomers were obtained when charges of 2.5–10.0 percent of monomers were used. The coatings from these terpolymers had lower abrasion resistance when they contained practical levels of the UV screener. Best coatings had optical densities of about 0.5 in the 3,000 A region. These showed some improvement in adhesion retention under 2,537 A irradiation but did not show improvement in the Weather-Ometer. The latter was attributed to hydrolysis (and leaching) and/or poor photostability of the salicylate moiety.

SUMMARY OF THE INVENTION

The polymers of the present invention consist essentially of alternating units of $-CF_2-CFX-$, wherein X is F or Cl, with units derived from vinyl ethers having the formulae:

and

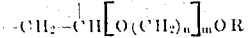

wherein
n is an integer of 2–6,
m is 1 or 2 and R is a stable aromatic radical joined to oxygen through an aromatic carbon atom, said R group absorbing light in the region of 2,800 to 4,000 A, and the total of the R groups containing units being present in an amount of from about 5 to about 50 percent by weight of the polymer.

DETAILED DESCRIPTION OF THE INVENTION

The novel polymers of the present invention incorporate in their structure ultraviolet absorbing groups. The polymers are soluble in polar solvents and are readily coated by a variety of techniques, either alone or in combination with other materials, particularly polysilicic acid to form thin films which afford excellent protection from degradation by ultraviolet light, and, depending on the formulation, abrasion resistance.

The polymers can be represented by the formula

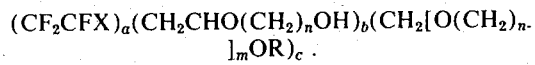

wherein
$a = b + c$ and the units $(CF_2CFX)$ alternate with the vinyl ether derived units and wherein
X is F or Cl
n is an integer of 2–6 inclusive,
m is 1 or 2, and
R is the ultraviolet light absorbing group discussed in detail hereinbelow.

The $CF_2CFX$ units are derived from tetrafluoroethylene, wherein X is F, which is a preferred comonomer or from chlorotrifluoroethylene when X is Cl.

The polymerizable alcohol unit $CH_2CHO(CH_2)_nOH$ where n is 2–6 is a primary hydroxyl containing vinyl ether including 2-hydroxyethyl vinyl ether, 3-hydroxypropyl vinyl ether, 4-hydroxybutyl vinyl ether, 5-hydroxypentyl vinyl ether, and 6-hydroxyhexyl vinyl ether. These vinyl ether alcohols are generally easily obtained by reaction of acetylene with the corresponding dihydroxy compound.

The copolymerizable monomeric compounds that contain the UV absorbing group are vinyl ethers of the preceding type and vinyl ethers of the formula $CH_2CH[O(CH_2)_n]_mOH$ such as 2-[2-hydroxyethoxy]ethyl vinyl ether in which the hydrogen of alcoholic hydroxyl has been replaced by an aromatic UV-absorbing group wherein the oxygen of the alcohol is bonded directly to an aromatic carbon atom. These compounds can be made by reaction of a vinyl oxyalkyl halide with a UV absorber having aromatic hydroxy at the point of attachment, i.e., by reaction of the appropriate vinyl ether halide with a hydroxy group of hydroxybenzophenone, hydroxybenzotriazole, hydroxyquinazoline, s-triazine, and salicylic acid derivatives. This reaction is conducted suitably at 100°C or above in dimethyl sulfoxide with sodium methoxide as the acid acceptor.

Particularly useful copolymerizable vinyl ethers that contain a stable ultraviolet absorbing portion can be represented by the following formulas:

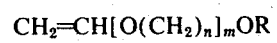

where

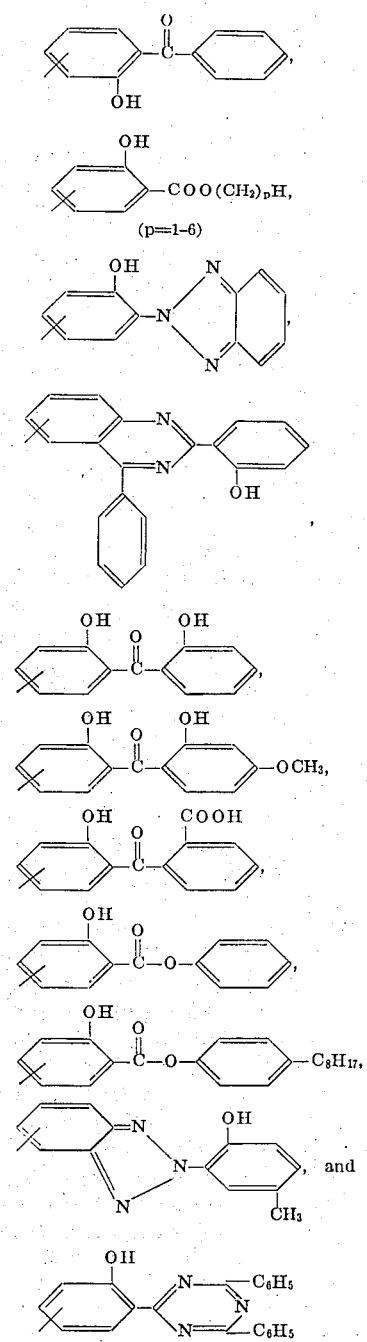

which may optionally have up to two inert substituents, such as halogen, alkyl, phenyl, alkoxy on nuclear carbon.

The general procedure for the preparation of film-forming terpolymers of this invention is the conventional free-radical initiated polymerization as described in U.S. Pat. Nos. 2,468,664 and 3,429,845-6. Since tetrafluoroethylene or chlorotrifluoroethylene have high vapor pressures, the polymerization is conducted in pressure resistant vessels. A charge of hydroxyalkyl vinyl ether, vinyloxyalkoxy derivative of the hydroxy UV-absorbing monomer with azodiisobutyronitrile is dissolved in tertbutanol and air removed by purging with nitrogen. The reaction vessel is generally cooled and the polyfluoroethylene monomer charged (generally in excess). The vessel is then heated with agitation. The temperature is dependent upon the specific catalyst but usually 60°–80° is satisfactory for about 3–6 hrs. The reaction mixture is then cooled and the polymer solution removed. The polymer can be precipitated by adding a hydrocarbon diluent and redissolved in butyl alcohols for increased purity.

By changing the ratio of the vinyloxy UV-derivative to hydroxyalkyl vinyl ether, the amount present in the polymer can be varied. It is generally preferred that the terpolymer contain 5–50 weight percent of the UV-absorbing repeating unit.

The polymers of the present invention are soluble in polar organic solvents such as lower aliphatic alcohols, lower aliphatic ketones, acetonitrile, lower aliphatic esters such as ethyl acetate, dioxane, furane, dimethyl sulfoxide, and dimethyl formamide.

In general, the solubility tends to decrease with increasing amounts of the ultraviolet light absorbing monomer.

The polymers of the present invention are insoluble or only slightly soluble in benzene, ether, methylene chloride, carbon tetrachloride, trichloroethane and the like. Accordingly such solvents can be employed to precipitate the polymers of this invention from solution and can thus be employed to purify the polymers before use, although in many instances this is not essential.

The polymers of the present invention form clear, tough, flexible, colorless films which have excellent adhesion to a wide variety of substrates and can be used as coatings to protect such substrates from degradation by ultraviolet light. The inherent viscosity of the polymers, measured at a concentration of 0.1 percent in acetone at 25°C, generally is in the range of 0.1 to 1.0 and usually 0.5 to 0.7.

The polymers of the present invention are particularly suited for use in coatings mixed with polysilicic acid, similar to the coating compositions taught in U.S. Pat. No. 3,429,845. For this purpose the silicic acid in the composition can range from about 10 to about 90 percent of the weight of the composition and preferably about 20 to about 50 percent, the percentages in each case being calculated as silica. The polysilicic acid is prepared by hydrolyzing tetraethylsilicate in a mixture of ethyl alcohol and water or more preferably 0.1N hydrochloric acid in the ratio of about 5:1 to 2:1, preferably about 3–4:1. The polysilicic acid solution is then mixed with terpolymer solution and applied to the substrate by conventional solution coating techniques such as flowing, spraying, dipping and the like. The compositions are finally dried and preferably baked, the maximum baking temperature being maintained below the heat distortion temperature of the substrate and in any event below about 200°C. Finally, the coating can be ground and polished to an optical finish if desired.

Very thin coatings (0.1 $\mu$) can be employed but in general coatings of about 3–20 $\mu$ of either the polymers of the present invention or such polymer with adjuvants can be employed to give excellent UV protection to the substrate. In particular, excellent adhesion is obtained when the polymers are employed with polysilicic acid to give abrasion resistant coatings, further the ultraviolet absorbing property is retained during the baking operation which generally tends to eliminate low molecular weight protective agents by volatilization or migration.

This invention is further illustrated by the following specific embodiments, which should not, however, be construed as fully delineating the scope of this discovery.

EXAMPLES 1–4

Terpolymers of 2-hydroxy-4-(2′-vinyloxyethoxy)-benzophenone with tetrafluoroethylene and 4-hydroxybutyl vinyl ether A. Preparation of 2-hydroxy-4-(2′-vinyloxyethoxy) benzophenone. 2,4-Dihydroxybenzophenone (107.1 g, 0.5 mole) was dissolved in 400 ml of dry dimethylsulfoxide under nitrogen. Sodium methoxide (27.02 g, 0.5 mole) was then added portionwise with cooling, followed by 58.6 g (0.55 mole) of 2-chloroethyl vinyl ether. The mixture was heated 1.5 hr at 60°C then 3.5 hrs at 95°–100°C. It was then cooled and poured into ca. 3 liters of an ice/water mixture. The resulting precipitate was filtered, washed (triturated) with fresh water, and dried; wt. = 136 g. Two recrystallizations of the crude material from ethanol/water gave the pure product (yield ~20–30 percent) as colorless crystals, m.p. 63°–66°C. The product was characterized by IR, nmr, UV and elemental analysis.

Anal. Calcd. for $C_{17}H_{16}O_4$ (284.3):
C, 71.81; H, 5.67
Found:
C, 71.81 (72.01); H, 5.71 (5.65)

The UV spectrum (MeOH) showed $k$ (λ max 3,240 A) = 35.5; $k$ (λ max 2,860 A) = 56.4; $k$ (λ max 2,410 A) = 37.1 (for 2,4-dihydroxybenzophenone.: $k$ (λ max 3,220 A) = 47.2, $k$ (λ max 2,880 A) = 65.2, $k$ (λ max 2,430 A) = 49.6).

The yield of the reaction was doubled by conducting it at 100°–110°C.

B. Preparation of Terpolymers of Tetrafluoroethylene (TFE) 4-hydroxybutyl vinyl ether (HBVE) and 2-hydroxy-4-(2′-vinyloxyethoxy)benzophenene (I).

Terpolymers were prepared using the ultraviolet absorbing monomer described hereinabove in part A. All runs were conducted at 70°C for 4 hours using azodiisobutyronitrile catalyst. The quantities of starting materials employed are shown in Table I, together with the yield, inherent viscosity measured in acetone (0.1%/25°C), analytical data, the specific absorbence measured in units of $K$ = liter $gm^{-1}$ $cm^{-1}$ and the weight percentage of I in the polymer determined from the ultraviolet absorption. Since the tetrafluoroethylene/vinyl ether polymer is virtually transparent to UV light above ca. 2,500 A radiation, the absorption in the near UV is due entirely to the benzophenone portion of the polymer. The specific absorbances ($k$ = liter $gm^{-1}$$cm^{-1}$) in methanol for typical polymers containing various amounts of the 2-hydroxy-4-vinyloxyethoxybenzophenone are given below, along with the $k$ values of the monomer for comparison.

| Wave-length (λmax) | Specific Absorbance ($k$ = liter $gm.^{-1}$ $cm.^{-1}$) | | | |
|---|---|---|---|---|
| | 9.2 wt. % in polymer | 19.4 wt. % in polymer | 24.7 wt. % in polymer | Monomer |
| 3240 A | 3.22 | 7.09 | 9.07 | 35.5 |
| 2870 A | 5.15 | 10.7 | 13.8 | 56.4 |
| 2410 A | 3.43 | 7.59 | 9.62 | 37.1 |

TABLE I

Preparation of Terpolymers of TFE/HBVE/I

| Example | Materials Charge (g) | | | | Cat. | Appear. | Polymer solution Solid (g) | Inh Visc. | Properties of Isolated Polymer Anal Specific Absorbence | | Wt.% I |
|---|---|---|---|---|---|---|---|---|---|---|---|
| | TFE | HBVE | I | t-BuOH | | | | | | | |
| 1 | 24 | 16 | 4 | 220 | 0.1 | Clear | 25.5 | 0.58 | C, 47.22 k(3240 A) = <br> H, 5.69 k(2860 A) = <br> F, 32.19 k(2420 A) = | 3.22 <br> 5.15 <br> 3.43 | 9.2 |
| 2 | 24 | 18 | 12 | 220 | 0.15 | Clear | 27.3 | 0.49 | C, 49.23 k(3240 A) = <br> H, 5.65 k(2860 A) = <br> F, 29.31 k(2420 A) = | 7.09 <br> 10.7 <br> 7.59 | 19.4 |
| 3 | 24 | 18 | 18 | 220 | 0.15 | Clear | 25.3 | 0.47 | C, 50.43 k(3240 A) = <br> H, 5.35 k(2860 A) = <br> F, 27.78 k(2420 A) = | 9.07 <br> 13.8 <br> 9.62 | 24.7 |
| 4 | 24 | 9 | 18 | 200 | 0.15 | Hazy | 15.0 (insoluble in T-BuOH) | 0.29 | C, 56.04 k(3230 A) = <br> H, 5.27 k(2870A) = <br> F, 21.52 k(2420 A) = | 15.1 <br> 23.4 <br> 16.2 | 39.7 |

A film 3.8μ (0.15 mil) thick prepared on a quartz plate using the terpolymer having 18 wt. % of the UV absorbing monomer showed an optical density of 3.66 at λmax = 3,240 A. This density gives substantially total opaqueness to UV light and is well in excess of the amount generally needed in coatings for protective purposes.

Terpolymers with hydroxybenzophenone monomer content greater than ca. 25 wt. % are less soluble in t-butanol and precipitated from solution during preparation. The polymers were still soluble in acetone or acetonitrile, but molelcular weights were lower; i.e. $\eta_{inh}$ = 0.2–0.3.

EXAMPLE 5

Terpolymer of Tetrafluoroethylene/4-Hydroxybutyl Vinyl Ether/Methyl 2-Hydroxy-4-Vinyloxyethoxybenzoate $CF_2CF_2/CH_2=CH—O—(CH_2)_4OH/$

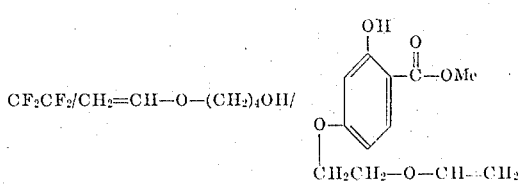

Methyl 4-vinyloxyethoxy salicylate monomer terpolymerized efficiently with tetrafluoroethylene and 4-hydroxybutyl vinyl ether to give a high yield of colorless, alcohol soluble product. There was used 24 g of TFE, 16.0 g of HBVE, 4.0 g of the salicylate, 0.1 g of azodiisobutyronitrile and 200 g of t-butyl alcohol for 4 hrs at 70°C. The polymer solution was clear and colorless and contained ~33 g of solids which were precipitated with benzene. The properties of isolated rubbery, tough, colorless solid polymer were:

$\eta_{inh} = 0.79$ (0.1% in acetone at 25°C.)
Anal.: C, 45.34; H, 5.12; F, 33.30
$k$ ($\lambda$ max 2,970 A) = 2.52; $k$ ($\lambda$ max 2,580 A) = 6.38
Wt. % Salicylate Monomer = 8.8

Methyl 2-hydroxy-4-(2'-vinyloxyethoxy)benzoate was prepared as follows: 16.8 g (0.2 mole) methyl 2,4-dihydroxy benzoate, 5.94 g (0.11 mole) sodium methoxide, 11.72 g (0.11mole) 2-chloroethyl vinyl ether and about 400 ml. dimethylsulfoxide were heated at 60° for 1.5 hr. and 95°–100° for 3.5 hrs., cooled and poured into ice/water. The crude product that was isolated weighed 15.3 g and had m.p. 62°–64°C. Pure material of m.p. 65°–65.6°C. was obtained after one recrystallization from ethanol/water of 3/1 ratio. The colorless product was characterized by IR, nmr, UV and elemental analysis.

Anal. Calcd. for $C_{12}H_{14}O_5$ (238.2):
C, 60.49; H, 5.92
Found:
C, 60.21; H, 5.70

The UV spectrum (MeOH) showed $k$ ($\lambda$ max 2,960 A) = 28.7; $k$ ($\lambda$ max 2,580 A) = 72.1.

EXAMPLE 6

Terpolymer of Tetrafluoroethylene/4-Hydroxybutyl Vinyl Ether/2-(2'-Hydroxyphenyl)-4-Phenyl-6-Vinyloxyethoxyquinazoline

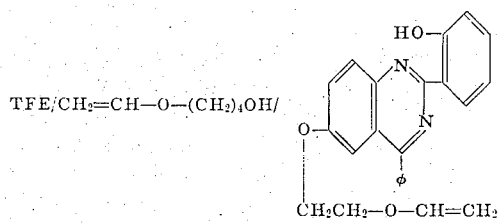

The following describes a polymerization in which methyl acetate was used as the solvent. The charge was 24 g of tetrafluoroethylene, 16.0 g of 4-hydroxybutyl vinyl ether, 2 g of the quinazoline, 200 g of methyl acetate and 0.15 g of $\alpha,\alpha$-azodiisobutyronitrile. The polymerization conditions were 4 hrs. at 70°C. The polymer solution was clear, but yellow with ~11.3 g solids (when precipitated with benzene) as tacky, pale yellow, rubbery polymer. Properties of isolated polymer were:

$\eta_{inh} = 0.30$ (0.1% in acetone at 25°C.)
Anal.; F, 34.88; N, 0.80
$k$ ($\lambda$ max 3,700 A) = 0.680, $k$ ($\lambda$ max 3,250 A) = 1.65, $k$ ($\lambda$ max 2680 A) = 4.17
Wt. % quinazoline monomer = 42

Better yields were obtained by carrying out the polymerization at higher temperatures using 1,1'-azodicyclohexanecarbonitrile catalyst.

2-(2'-Hydroxyphenyl)-4-phenyl-6-(2'-vinyloxyethoxy)quinazoline was prepared as follows: 2-(2'-hydroxyphenyl)-4-phenyl-6-methoxyquinazoline was treated with pyridine/hydrogen chloride to give the 6 hydroxy compound (m.p. 253°–255°C). The latter product (31.4 g), 5.94 g sodium methoxide, 11.72 g of 2-chloroethyl vinyl ether and 400 ml. of dimethyl sulfoxide was stirred and heated under nitrogen for 1.5 hr.

at 60°C. and 3–5 hr. at 90°–100°C. It was then cooled and poured into ca. 2 liters of an ice/water mixture. The precipitate was filtered, washed (triturated) with fresh water, and dried; wt. = 32.1 g, m.p. 115°–133°C. One recrystallization from isopropyl alcohol gave the pure product (18.7 g), as pale yellow crystals, m.p. 141°–142°C. The product was characterized by IR, nmr, UV and elemental analysis.

Anal. Calcd. for $C_{24}H_{20}N_2O_3$ (384.42):
C, 74.98; H, 5.24; N, 7.28
Found:
C, 74.73; H, 5.27; N, 7.01

The UV spectrum (MeOH) showed $k$(sh) ($\lambda$ max 3,650 A) = 18.0; $k$ ($\lambda$ max 3,230 A) = 39.5; $k$ ($\lambda$ max 3,030 A) = 36.2; $k$ ($\lambda$ max 2,680 A) = 105.0.

When 2-(2',4'-dihydroxyphenyl)benzotriazole

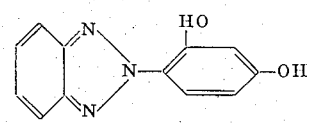

is used in the procedure following Example 4, there is obtained the 2-(2'-hydroxy-4'-vinyloxyethoxyphenyl)-benzotriazole. The latter copolymerizes with chlorotrifluoroethylene or tetrafluoroethylene to give with hydroxybutyl vinyl ether, terpolymers containing generally 5–25 percent of the triazole vinyl ether unit.

COATING PROPERTIES

A mixture of the terpolymer of Examples 1–4 with polysilicic acid was coated on a quartz plate (Designated "A"). A similar coating was prepared from polysilicic acid/tetrafluoroethylene-hydroxybutyl vinyl ether to which was added an equivalent amount of 4($\beta$-hydroxyethyl)-2-hydroxybenzophenone (Designated "B"). Exposure results in a Weather-Ometer are shown in the table.

| Weather-Ometer Exposure (Wet) | % Loss of Optical Density at 3240A | |
|---|---|---|
| | A-Terpolymer | B-Copolymer & Monomer |
| 500 hrs. | 22 | 37 |
| 1000 hrs. | 47 | 66 |

The increased loss of screening power is evident for the monomeric UV-screening additive even with this benzophenone, one of the most durable in this system.

Coatings of solutions of the terpolymers of Examples 1–4 were obtained by casting with use of a doctor knife or by dipping the plastic substrate in a coating solution. They were applied to an optically clear panel containing principally poly(chloral/-p-chlorophenylisocyanate) — see British Pat. No. 1,151,002 — polymerized in the presence of methylmethacrylate.

Exposures were conducted in the Weather-Ometer using dry and standard (wet cycle) conditions to determine the contribution of moisture to yellowing and crazing of the panels. As before, coated and uncoated portions of the same panel were assessed during the exposures. Both coatings behaved about the same. The table below gives results for the hand cast coating; thickness ~3.7$\mu$ and optical density = 3.66 at 3,260 A.

| | Weather-Ometer Exposures | | | | |
|---|---|---|---|---|---|
| Hrs. Expd. | Yellowness Uncoated | Coated | Adhesion (Exp. Side) | Crazing Uncoated | Coated |
| Wet Conditions | | | | | |
| 0 | — | — | 100 | Clear | Clear |
| 86 | 0.36 | 0.15 | 50 | do. | do. |
| 178 | 0.51 | 0.24 | 20 | Crazed | do. |
| 310 | 0.75 | 0.29 | 0 | Severe Craze | do. |
| 507 | 2.8 | 0.49 | 0 | Almost Opaque | do. |
| Dry Conditions | | | | | |
| 0 | — | — | 100 | Clear | Clear |
| 84 | 0.33 | 0.14 | 97 | Clear | do. |
| 173 | 0.50 | 0.22 | 75 | Clear | do. |
| 298 | 0.76 | 0.38 | 20 | Sl.Craze | do. |
| 514 | 1.2 | 0.48 | 0 | Crazed | do. |

The panels crazed less readily in the uncoated areas under dry conditions; however, there was no crazing in the coated areas for both sets of conditions even after an additional 500 hr. exposure. The resistance to yellowing was improved about six-fold.

The degree of yellowing upon exposure was measured according to the following equation:

$$\text{Yellowness } (Y) = B - A/1 - G,$$

where $A = A6000 \, A + A7000 \, A/2$ (average absorbance at 6,500 A)

$B = A4200 \, A + A5000 \, A/2$ (average absorbance at 4,600 A)

$G = A5000 \, A + A6000 \, A/2$ (average absorbance at 5,500 A)

Coatings were applied to polycarbonate sheet by doctor-knifing and dip coating using solutions of the terpolymer of Examples 1 to 4 in t-BuOH/n-BuOH ~ 5/1 by wt. The solutions for dip coating were further modified by adding acetic acid plus a few drops of alkylene oxide/methyl siloxane copolymer (Union Carbide Corp. L-520) to promote formation of a smoother coating.

Both procedures gave coatings with excellent adhesion when the panels were baked in an air oven for 16 hr. at 130°C. The coatings were then evaluated for adhesion retention (by test in U.S. Pat. No. 3,546,318) and durability in the Weather-Ometer relative to a control coating of copolymer (no screening monomer present). Adhesion results are summarized below.

| | | Weather-Ometer Exposure Coating | | |
|---|---|---|---|---|
| Polymer | Method | Optical Den. (3250 A) | Hrs. to loss of Adh. Wet Cycle | Dry Cond. |
| Terpolymer (Ex. 2) | doctor knife | 3.66 | 6000 | 5500 |
| Terpolymer (Ex. 1) | do. | 1.42 | 1230 | 4000 |
| Terpolymer | dip coat | 1.77 | 2200 | — |
| Copolymer | do. | 0 | 540 | 780 |

The first coating of the above table (optical density 3.66; thickness ~5.5μ) shows outstanding durability and adhesion retention under dry or wet cycle conditions. Furthermore, there is no indication of yellowing, crazing or other signs of deterioration of the coating and underlying substrate. Coatings with less optical density (screening power) behaved less dramatically, but nevertheless still showed good adhesion retention relative to the control.

Superior adhesion retention was found (after curing for 16 hrs. at 130°) when the terpolymer contained combined UV screening agent. Multilayer coatings can be applied to polycarbonate sheets. Good properties of adhesion as well as scratch resistance have been obtained when a terpolymer layer is coated on the polymer and baked, then followed by a layer of the polysilicic acid/-copolymer of the type described in U.S. Pat. No. 3,429,845.

Terpolymers such as prepared according to Examples 1–4 have outstanding adhesion to polymethylmethacrylate sheets. Coatings applied at room temperature and not subject to baking could not be removed by a adhesive tape pull test and adhesion is retained for extremely long times of Weather-Ometer exposures. When polysilicic acid is added to increase abrasion resistance, good adhesion is attained by heat treatment such as an hour at 170°C of for longer periods at lower temperatures, (e.g., 5–16 hrs. at 130°C).

The new terpolymers, either alone or with adjuvants, are useful for coating a variety of materials to provide UV-resistant surfaces. A butyl alcohol solution of 12 percent of a terpolymer similar to Examples 1 and 2 but containing about 15 percent of absorbing monomer I was used to coat various woods (redwood, fir plywood, yellow and white pine). The coatings were stable on Weather-Ometer exposure. For example, a control redwood panel underwent surface fading in 100 hrs. whereas the coated product underwent no substantial change in over 10 times this exposure. The new terpolymers are particularly useful in the preparation of scratch resistant coatings for plastics or other surfaces when substituted for the copolymers of U.S. Pat. No. 3,429,845 in the polysilicic acid/polyfluoroethylenehydroxyalkyl vinyl ether complexes.

By the use of a 27/73 wt. % $SiO_2$/Terpolymer of Example 1, a sheet of polymethylmethacrylate was coated by the dip method and cured 60 min. at 170°C. The coatings showed optical densities (maxima) ranging from 0.7 to 2.3 at 3,240 A and 1.1 to 3.5 at 2,870 A (film thickness ~4–6μ). There is no loss of optical density of the UV screener during cure. The coatings are comparable to similar copolymer coatings with respect to initial adhesion, scratch resistance and other properties. Compared to a control panel, which failed at 2,537 A at 12 hours, coatings from the various terpolymers gave satisfactory protection for periods of 30 to over 120 hours.

Coatings of polysilicic acid/terpolymers containing combined UV screening agent have excellent adhesion to polycarbonate surfaces after the latter has been primed by soaking for about a minute in a solution of 10g of γ-aminopropyl triethoxysilane (Union Carbide A-1100) with 0.2g of block copolymer of ethylene oxide and propylene oxide with dimethyl siloxane (Union Carbide L-530) in 190g of n-butyl alcohol or of 3 wt. % of the amino silane in water suitably at 80°–90° for 10 minutes and dried in air or an oven.

Using terpolymers prepared according to the general procedures of Examples 1–4 having 7.2 to 16.9 percent of 2-hydroxy-4-(2'-vinyloxyethoxy)benzophenone (I) with 27 wt. % $SiO_2$, polycarbonate panels were dip coated and cured at 130° for 2 hours or more. Coating thickness was 5–6μ. When the terpolymer had about 16.9 percent of (I) and an initial optical density of 3.47 at 2,880 A, the final coating was satisfactory after 72 hours under 2,537 A irradiation whereas a control coated copolymer (the same except no combined UV-absorber) failed in less than 3 hours.

The coatings showed a marked improvement in adhesion retention relative to controls in Weather-Ometer exposures under standard (wet cycle) and dry conditions, as well as in the 2,537 A accelerated test. The degree of improvement depended largely on the optical density (UV screening power) of the coating and to some extent on longer cure conditions. For example, a control coated panel lost adhesion at <275 hours, whereas the terpolymer coated panel did not lose adhesion until after 2,000 hours. Furthermore, the substrate showed no signs of yellowing under the coating, even after additional exposure.

Instead of polysilicic acid, 5 to 45 percent by weight of a hexa(alkoxyalkyl)melamine, e.g., hexa(methoxymethyl)melamine, can be combined with the terpolymers described above to give solutions which can be applied to plastic surfaces such as polycarbonate sheets, or to metals, to provide adherent, scratch-resistant and ultraviolet-resistant coatings.

Since obvious modifications and equivalents in the invention will be evident to those skilled in the arts, I propose to be bound solely by the appended claims The embodiments of the invention in which an exclusive property or privilege is claimed are defined as follows:

1. A polymer consisting essentially of alternating units of a polymer having the formula $$-CF_2-CFX-$$

wherein X is F or Cl with units derived from vinyl ether having the formula $$-CH_2-\overset{|}{C}HO(CH_2)_nOH$$

and $$-CH_2-\overset{|}{C}H[O(CH_2)_n]_mOR$$

wherein $n$ is an integer of 2-6, $m$ is 1 or 2 and R is selected from

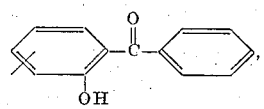

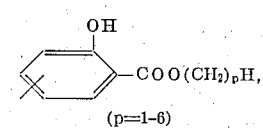

(p=1-6)

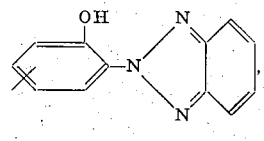

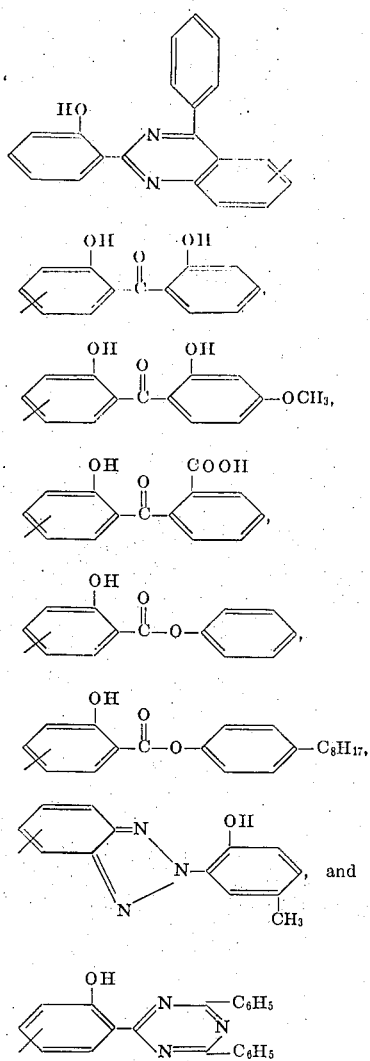

said units being proportioned to provide R groups in an amount of from 5 to 50 percent by weight of said polymer, said polymer having an inherent viscosity measured in 0.1 percent by weight solution in acetone at 25°C of 0.1 to 1.0.

2. Polymer of claim 1 wherein R is

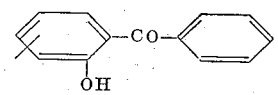

3. An article having a protective coating comprising a polymer of claim 2.

4. An article of claim 3 wherein said coating has a thickness of about 3 to about 20μ.

* * * * *